INVENTOR.
WILLIAM G. ANDERSON
BY
ATTORNEY

Jan. 26, 1965  W. G. ANDERSON  3,167,697
SYNTHETIC RATE GENERATOR
Filed Oct. 11, 1960  3 Sheets-Sheet 3

INVENTOR.
WILLIAM G. ANDERSON
BY
ATTORNEY

United States Patent Office 3,167,697
Patented Jan. 26, 1965

3,167,697
SYNTHETIC RATE GENERATOR
William G. Anderson, Cedar Rapids, Iowa, assignor to Collins Radio Company, Cedar Rapids, Iowa, a corporation of Iowa
Filed Oct. 11, 1960, Ser. No. 61,962
5 Claims. (Cl. 85—65)

This invention relates in general to servomechanisms, and in particular to an on-off type of system.

As servomechanisms have become more and more common it has been desirable to improve their stability and accuracy as much as possible. Such mechanisms are used for indicating remotely such quantities as magnetic heading, bearing, and distance to a radio facility.

It is an object of this invention, therefore, to provide a servomechanism of improved response which utilizes a synthetic tachometer signal to provide rate feedback.

An object is to allow a two-phase servo system to be operated with no power connected to the motor when no rotation is necessary.

Another object of this invention is to provide an improved servomechanism.

A feature of this invention is found in the provision for an improved servomechanism which synthesizes the motor characteristic and feeds it into the servo loop.

Further features, objects, and advantages will become apparent from the following description and claims when considered in the light of the drawings, in which:

In this invention a passive electrical circuit has been added to a servomechanism to obtain an improved system which does not require a rate generator. The electrical circuit has a response which is similiar to the start-up and coast-to-stop characteristic of the servomotor which can be fed into the servo loop to stabilize the system.

Systems are shown and described which utilize direct current and alternating current.

Figure 1:
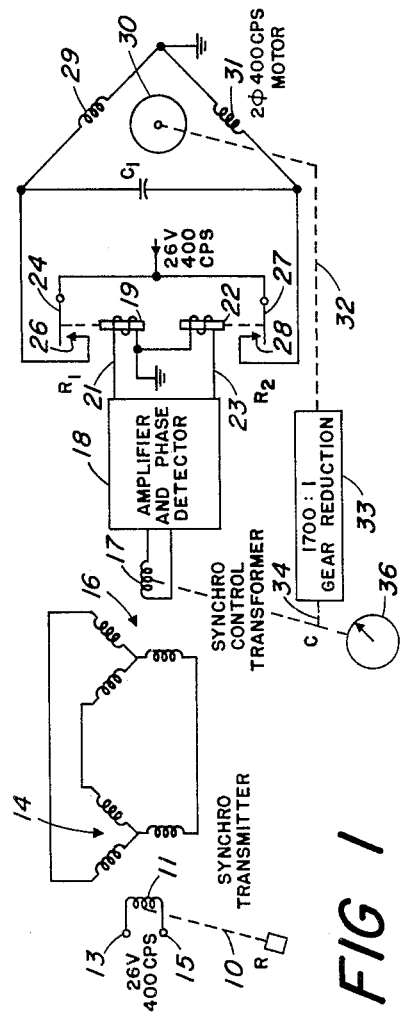
FIGURE 1 illustrates an on-off type of servomechanism.

FIGURE 1 illustrates a servomechanism which has a command shaft 10 which controls the rotor 11 of a synchro transmitter 14. The rotor 11 is energized by a suitable voltage supply, as for example, 26 volts, 400 cycle A.C., which is applied to the terminals 13 and 15. The three-phase stator winding of synchro 14 is connected to the stator winding of a control transformer 16.

The rotor 17 of the synchro control transformer 16 supplies an input to an amplifier and phase detector 18. A first relay 19 receives an input from the amplifier and phase detector 18 through lead 21 and a second relay 22 receives an input from the amplifier and phase detector 18 through lead 23. Relay 19 controls movable contact 24 to cause it to engage contact 26 when the relay 19 is energized. Relay 22 controls movable contact 27 to cause it to engage contact 28 when the relay is energized. Contacts 24 and 27 are connected together and to one side of a suitable voltage source, as for example, 26 volts, 400 cycle A.C.

Contact 26 is connected to a first phase 29 of a two-phase motor 30. Phasing condenser $C_1$ is connected across phases 29 and 31 of the motor 30. The output shaft 32 of the motor is connected to a gear reduction 33. The output shaft 34 of the gear reduction is connected to the rotor 17 of synchro transformer 16 and to an indicator 36.

Movement of the control shaft 10 causes a signal to be detected in the rotor winding 17 if shaft 34 does not have the same position as the control shaft 10. The signal produced in the rotor winding 17 will have an amplitude dependent upon the amount of the angular deviation between shafts 10 and 34 and will have a phase dependent upon the necessary direction of correction. The amplifier and phase detector 18 converts the A.C. signal to a D.C. output which will energize either relay 19 or 22, depending upon the polarity of the signal. If relay 19 is energized, contact 24 will engage contact 26 and the motor 30 will rotate in one direction. If relay 22 is energized, contact 27 will engage contact 28 and the motor 30 will rotate in the opposite direction. The motor will continue to rotate in either case until the rotor 17 and indicator 36 agree with the new position of the control shaft 10. When this occurs the rotor 17 will be positioned so that no signal is detected and the relay will be de-energized. This disconnects the power to the motor and it coasts to a stop. Due to the inertia of the motor it may coast beyond the zero position. This gives rise to an error.

Figure 2:
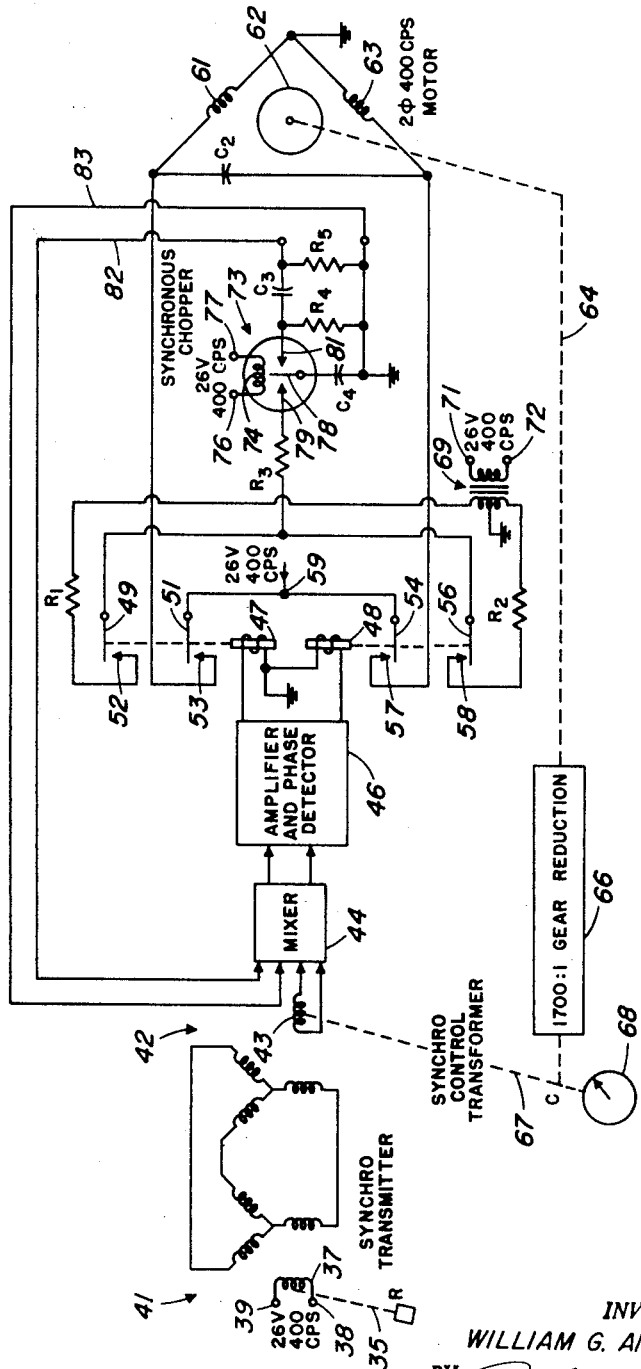
FIGURE 2 illustrates an A.C. servomechanism in block form utilizing a synthetic tachometer signal.

To alleviate this error the system of FIGURE 2 may be used. FIGURE 2 illustrates the circuit of FIGURE 1 with a stabilizing feedback signal. To add stability and accuracy to a system such as shown in FIGURE 1, it has been known that a rate generator may be connected to the output shaft of the motor and the output fed back in opposition to the error signal. This signal will cause the motor to come to a stop quickly when the error signal goes to zero and will in general add stability to the system.

The apparatus of FIGURE 2 incorporates a synthetic rate signal which is generated by a modulator-demodulator and filter combination and incorporated in the servomechanism to stabilize the system. This replaces the conventional generator on the output shaft of the motor. In this application "synthetic rate signal" means a signal derived from a circuit which synthesizes a rate signal which when added degeneratively with an error signal will cause a servomotor to operate with zero error. Such signal is derived from a circuit which has a transfer characteristic equivalent to the buildup-to-speed and coast-to-stop response of a particular motor or type. "Synthetic rate circuit" defines a circuit for producing a "synthetic rate signal."

FIGURE 2 illustrates a control shaft 35 which is energized by a suitable voltage source that is supplied to contacts 38 and 39. The rotor 37 is part of the synchro transmitter 41 which has a three-phase stator that is connected to the stator of a synchro control transformer 42. A rotor 43 of the control transformer 42 supplies an input to a mixer 44. The output of the mixer 44 is received by amplifier and phase detector 46 which supplies its output to a pair of relays 47 and 48. Relay 48 controls a pair of movable contacts 54 and 56 which are engageable respectively with contacts 57 and 58. Relay 47 controls movable contacts 49 and 51 engageable with contacts 52 and 53. Movable contacts 51 and 54 are connected together and to one side of a suitable voltage, as for example, 26 volts, 400 cycle A.C., which is supplied to terminal 59. The other side of this power supply is connected to ground. Contact 53 is connected to one winding 61 of a two-phase motor 62. The other side of winding 61 is connected to ground. Contact 57 is connected to the second winding 63 of two-phase motor 62, and a phasing condenser $C_2$ is connected across the windings 61 and 63.

The output shaft 64 of the motor is connected to a gear reduction 66. The output shaft 67 of gear reduction 66 controls the rotor 43 and an indicator 68 which indicates the position of the control shaft. Contacts 52 and 58 are connected, respectively, to resistors $R_1$ and $R_2$ and to opposite ends of the secondary of a transformer 69. The center of the secondary is grounded. The primary of transformer 69 is energized at terminals 71 and 72 with a suitable voltage, as for example, 26 volts, 400 cycle A.C.

The movable contacts 56 and 49 are connected together and to a resistor $R_3$.

A chopper 73 has an energizing winding 74 which has contacts 76 and 77 to which a suitable energizing voltage may be connected, for example, 26 volts, 400 cycle A.C. A movable contact 78 is controlled by the winding 74 to move between contacts 79 and 81. A condenser $C_4$ is connected between movable contact 78 and ground. The other side of resistor $R_3$ is connected to stationary contact 79. Stationary contact 81 is connected to resistor $R_4$ which has its other side connected to ground. A condenser $C_3$ is also connected to contact 81. The other side of capacitor $C_3$ is connected by a lead 82 to the input of mixer 44. A resistor $R_5$ is connected between lead 82 and ground.

In operation, when the rotor 37 is moved by the shaft 35, the rotor 43 of the synchro control transformer will detect an error signal which will be supplied to the mixer 44. This signal is supplied through the mixer 44 to the amplifier and phase detector 46 which will produce a signal that will energize either relay 47 or relay 48. If relay 47 is energized, contacts 49 and 51 will engage contacts 52 and 53, respectively, which will cause motor 62 to run in a first direction because contact 51 completes the circuit through contact 53 to the motor power supply. At the same time, contact 49 will engage contact 52 and a signal will be fed to synchronous chopper 73 which will be filtered and fed back to the mixer 44. This signal will be subtracted from the error signal and will comprise a feedback signal to stabilize the system.

If the control shaft 35 had been moved in a direction opposite to the assumed one, then the error signal detected by rotor 43 would have caused relay 48 to be energized. This would have caused contact 54 to have engaged contact 57 and have caused the motor to run in the opposite direction. Simultaneously, contact 56 would have engaged contact 58 and a signal of opposite phase would have been supplied to the synchronous chopper and to the mixer 44 from the power supply connected to terminals 71 and 72.

A servomechanism according to this invention has been constructed utilizing the following components:

Gear reduction ratio 1700 to 1.

| | | |
|---|---|---|
| Resistance $R_1$ | ohms | 470 |
| Resistance $R_2$ | do | 670 |
| Resistance $R_3$ | do | 950 |
| Resistance $R_4$ | do | 10K |
| Resistance $R_5$ | do | 8.3K |
| Condenser $C_4$ | microfarads | 2 |
| Condenser $C_3$ | do | 0.8 |

Figure 4:
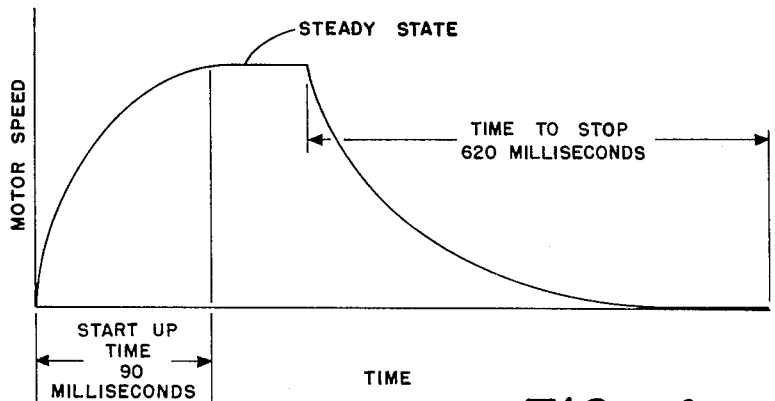
FIGURE 4 illustrates the characteristic of a servomotor.

FIGURE 4 illustrates the characteristic of the motor. When power is fed to the motor it builds up from zero velocity to a steady state speed in a relatively short time (90 milliseconds for the particular motor tested). When the power is disconnected, the motor coasts to a stop over a relatively long time (620 milliseconds for the particular motor). The reason why the motor builds up rapidly but slows much slower is because during build-up electrical energy is being supplied from an external source to overcome windage and inertia of the motor rotor. When coasting to a stop, the external power is disconnected and the motor coasts until windage and friction stop the rotor. Thus, the build-up and slow-down do not occur at the same rate.

The present invention provides a non-linear stabilizing signal by synthesizing a signal that matches the motor characteristic. In other words, during build-up to speed the chopper 73 and filter comprising resistor $R_3$ and capacitor $C_4$ have a short time constant to match the motor build-up (perhaps 90 milliseconds). However, when the relay 47 or 48 opens, the condensers $C_4$ and $C_3$ and resistors $R_4$ and $R_5$ are chosen to have a much longer time constant to match the coast-to-stop characteristic of the motor (620 milliseconds in one example). The component values given earlier produce this result.

Thus, a feedback signal has been produced which greatly improves the response and stability of the system.

Figure 3:
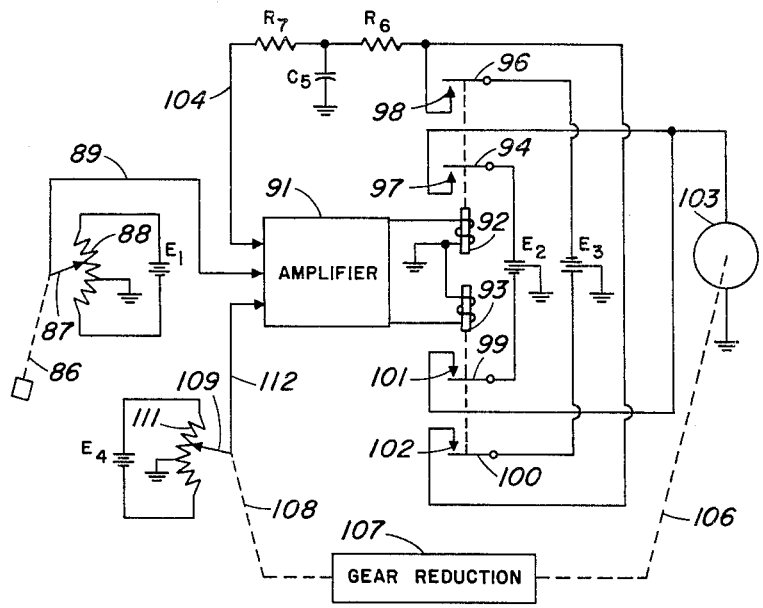
FIGURE 3 illustrates a D.C. servomechanism incorporating the synthetic signal of this invention.

FIGURE 3 illustrates the principle of this invention applied to a direct-current system. A control shaft 86 is connected to a variable contact 87 that engages resistor 88. The center of resistor 88 is connected to ground, and the ends of resistor 88 are connected to opposite ends of a suitable voltage source, as for example, the battery $E_1$. A lead 89 connects the contact 87 to an amplifier 91. Amplifier 91 is connected to a pair of relays 92 and 93. Relay 92 controls movable contacts 94 and 96, which engage respectively stationary contacts 97 and 98. Relay 93 controls movable contacts 99 and 100 which are engageable with stationary contacts 101 and 102. Stationary contacts 97 and 101 are connected together and to one side of a motor 103. The other side of the motor is connected to ground.

The battery $E_2$ has a center point connected to ground and its negative terminal connected to movable contact 99 and its positive terminal connected to movable contact 94. Stationary contacts 98 and 102 are connected together and to a filter comprising resistors $R_6$ and $R_7$ in series and a condenser $C_5$ which is connected between ground and the midpoint between $R_6$ and $R_7$. The output of the filter is connected by lead 104 to the input of amplifier 91. Movable contact 96 is connected to the negative side of a battery $E_3$ which has its midpoint connected to ground. The positive terminal of battery $E_3$ is connected to movable contact 100.

The motor 103 has its output shaft 106 connected to gear reduction 107. The output shaft 108 of gear reduction 107 is connected to a movable contact 109 which engages a resistor 111. The midpoint of resistor 111 is connected to ground and a battery $E_4$ is connected across the resistor 111. The lead 112 connects the movable contact 109 to the input of amplifier 91.

In operation control shaft 86 is moved from an initial position which supplies a signal to the amplifier 91. Amplifier 91 also receives a position follow-up signal from contact 109 and if the new signal called for by contact 87 is different from the position signal picked up by contact 109 the difference will be amplified and will energize one of the relays 92 or 93. Whether relay 92 or 93 is energized depends upon the direction of motion of the shaft 86 so that relay 92 will be energized when shaft 86 is moved in one direction and relay 93 will be energized when the shaft is moved in the opposite direction.

If relay 92 is energized contacts 96 and 94 will be closed and the motor will start to run in a first direction because it will be connected to the power supply $E_2$. Contacts 96 and 98 will also close, thus supplying a signal to the filter so as to charge condenser $C_5$ through resistor $R_6$. This signal will be supplied to the amplifier 91 through the resistor $R_7$. With batteries connected as shown, the feedback signal will be in opposition to the error signal and will provide a stabilizing and dampening signal. When the output of the amplifier is small enough to cause the relay 92 to open, condenser $C_5$ will discharge through resistor $R_7$ and provide an anticipatory voltage.

If shaft 86 had been moved in the opposite direction to the one assumed, relay 93 would have been energized and contact 99 would engage contact 100, thus causing the motor to rotate in the opposite direction. Contact 100 would engage contact 102 and a voltage of opposite potential would have been furnished through the filter $R_6$, $R_7$, and $C_5$ to the amplifier 91.

It is to be realized in D.C. motors by shorting the field when the motor is disconnected dynamic braking can occur which can cause the coast-down time to be equivalent to the speed-up time. In view of this fact a non-linear filter may not be required. However, if these times are substantially different, a non-linear filter would be desirable, and filters may be designed which will produce non-linear time constants.

It is seen that this invention provides examples of synthetically producing a feedback signal of a stabilizing nature for a servo system. Such systems do not require tachometers driven by the motor shaft such as are conventional.

Although this invention has been described with respect to preferred embodiments thereof, it is not to be so limited, as changes and modifications may be made therein which are within the spirit and scope of the invention as defined by the appended claims.

What is claimed is:

1. A servomechanism with rate feedback comprising: transmitter means for producing an output signal dependent upon the position of a movable element thereof, receiving means for producing an output signal dependent upon the position of a movable element thereof, error detecting means for comparing said output signals to produce an error signal representing a difference in the relative position of said movable elements, driving means, a power supply, switching means selectively energized in response to said error signal to apply the output of said power supply to selectively condition said driving means for rotation in either direction, a rate circuit in which a rate signal is developed corresponding to the build-up-to-speed and the coast-to-stop characteristic of said movable elements, said rate circuit comprising an electrical filter with two time constants, means responsive to the operation of said switching means for connecting said rate circuit to a source of power and means to supply the output of said rate circuit as a feedback signal to said error detecting means.

2. The apparatus according to claim 1 wherein said transmitter and receiver means are variable potentiometers.

3. A motor control system including a synchro transmitter and receiver the invention of which comprises: an amplifier and phase detector receiving an output of the synchro receiver, a pair of relays selectively energized according to the polarity of the output of the amplifier and phase detector, first and second pairs of contacts controllable by the first relay, third and fourth pairs of contacts controllable by the second relay, one contact of said first and third contact pairs being connected in common with a source of potential, a two-phase motor, the other contact of said first and third contact pairs each being connected to one phase of the two-phase motor to selectively condition said motor for rotation in either direction, one contact of the second and fourth pairs of contacts being connected together at a source of alternating power, a chopper-filter circuit connected to the other contact of said second and fourth pairs of contacts, said chopper-filter circuit comprising a chopper and filter components, the output of the chopper-filter circuit being fed to the amplifier and phase detector, and the output shaft of the motor being connected to the rotor of the synchro receiver to vary its angular position.

4. An apparatus according to claim 3 wherein the chopper-filter circuit has a first time constant corresponding to the build-up-to-speed time of the motor and a second time constant corresponding to the coast-to-stop time of the motor.

5. An apparatus according to claim 3 wherein the filter chopper circuit comprises: a chopper having two stationary contacts and a movable contact, a first resistor connected between the circuit input and the first stationary contact, a first condenser connected between ground and the movable contact, a second condenser connected between the circuit output and the second stationary contact, a second resistor connected between ground and the second stationary contact, and a third resistor connected between the output side of said second condenser and ground.

References Cited in the file of this patent

UNITED STATES PATENTS

| | | |
|---|---|---|
| 2,471,422 | Frost | May 31, 1949 |
| 2,632,872 | Warsher | Mar. 24, 1953 |
| 2,674,707 | De Mott | Apr. 6, 1954 |
| 2,760,131 | Braunagel | Aug. 31, 1956 |
| 2,774,928 | Johnson et al. | Dec. 18, 1956 |
| 2,830,245 | Davis et al. | Apr. 8, 1958 |
| 2,860,298 | Carlson | Nov. 11, 1958 |
| 2,995,101 | Jones | Aug. 8, 1961 |
| 3,048,759 | Howard | Aug. 7, 1962 |
| 3,100,277 | McCullough | Aug. 6, 1963 |